(12) United States Patent
Taniguchi

(10) Patent No.: US 8,623,970 B2
(45) Date of Patent: Jan. 7, 2014

(54) DIAPHRAGM FOR ELECTRO-ACOUSTIC TRANSDUCER

(75) Inventor: Kouichirou Taniguchi, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 13/607,122

(22) Filed: Sep. 7, 2012

(65) Prior Publication Data

US 2012/0325576 A1    Dec. 27, 2012

Related U.S. Application Data

(62) Division of application No. 12/161,742, filed as application No. PCT/JP2007/050806 on Jan. 19, 2007, now Pat. No. 8,389,672.

(30) Foreign Application Priority Data

| Jan. 23, 2006 | (JP) | ................................ | 2006-014107 |
| Oct. 26, 2006 | (JP) | ................................ | 2006-291149 |
| Nov. 20, 2006 | (JP) | ................................ | 2006-312866 |

(51) Int. Cl.
*C08G 75/10* (2006.01)
*C08L 81/06* (2006.01)
*C08G 75/23* (2006.01)
*C08L 81/00* (2006.01)

(52) U.S. Cl.
USPC ........ 525/535; 525/534; 525/328.5; 525/471; 528/391; 528/220; 528/373; 528/425; 428/220

(58) Field of Classification Search
USPC ............... 525/535, 534, 328.5, 471; 528/391, 528/220, 373, 425
See application file for complete search history.

(56) References Cited

U.S. PATENT DOCUMENTS

| 4,713,426 A | 12/1987 | Harris et al. |
| 5,204,400 A | 4/1993 | Kelly et al. |
| 2011/0188699 A1 | 8/2011 | Shibaoka et al. |

FOREIGN PATENT DOCUMENTS

| JP | 58-222699 A | 12/1983 |
| JP | 59-063897 A | 4/1984 |
| JP | 60-139099 A | 7/1985 |
| JP | 64-5300 | 1/1989 |
| JP | 01-149699 A | 6/1989 |
| JP | 01-174100 A | 7/1989 |
| JP | 05-500986 A | 2/1993 |
| JP | 05-025262 A | 4/1993 |
| JP | 3140051 B2 | 12/2000 |
| JP | 2002-291092 A | 10/2002 |
| JP | 2004-92859 | 3/2004 |
| TW | I222477 | 10/2004 |
| WO | WO 2004/081103 A2 | 9/2004 |
| WO | WO 2005/023928 A1 | 3/2005 |

OTHER PUBLICATIONS

Japanese Office Action issued Mar. 15, 2011, in Patent Application No. 2006-312866.
Japanese Office Action issued Mar. 15, 2011, in Patent Application No. 2006-291149.
Japanese Office Action issued Jun. 28, 2011, in Patent Application No. 2006-291149.
Office Action issued Nov. 1, 2011 in Japanese Patent Application No. 2006-291149.
Office Action issued on Oct. 25, 2013, in Taiwan patent Application No. 096102460.

*Primary Examiner* — Duc Truong
(74) *Attorney, Agent, or Firm* — Oblon, Spivak, McClelland, Maier & Neustadt, L.L.P.

(57) ABSTRACT

A diaphragm for electro-acoustic transducers, especially a diaphragm for speakers, and a film for the diaphragm excellent in the formability and the durability in high-output operation are obtained. A diaphragm for electro-acoustic transducers formed of a film that contains a polybiphenyl ether sulfone resin (A) having a specific repetitive unit or contains it and a crystalline resin (B) such as polyaryl ketone resin; and a film for use for the diaphragm.

13 Claims, No Drawings

DIAPHRAGM FOR ELECTRO-ACOUSTIC TRANSDUCER

The present application is Divisional application of Ser. No. 12/161,742, filed Jul. 22, 2008 now U.S. Pat. No. 8,389,672, which is a national stage application of PCT/JP07/050806 having a filing date of Jan. 19, 2007 and which claims priority to JP 2006-014107 having a filing date of Jan. 23, 2006; JP 2006-291149 having a filing date of Oct. 26, 2006; and JP 2006-312866 having a filing date of Nov. 20, 2006.

CROSS-REFERENCE TO PRIOR RELATED APPLICATIONS

This is a U.S. National Phase application under 35 U.S.C. §371 of International Application No. PCT/JP2007/050806, filed on Jan. 19, 2007, and claims benefit of Japanese Patent Application No. 2006-291149, filed on Oct. 26, 2006; Japanese Patent Application No. 2006-312866, filed on Nov. 20, 2006; and Japanese Patent Application No. 2006-014107, filed on Jan. 23, 2006. The applications are incorporated herein by reference. The International Application was published in Japanese on Jul. 26, 2007 as WO 2007/083751 under PCT Article 221(2).

FIELD OF THE INVENTION

The present invention relates to a diaphragm for electro-acoustic transducers used in various acoustic instruments, and to a film for use for it.

BACKGROUND

With the popularization of small electronics (for example, mobile telephone, PDA, laptop computer, DVD, liquid-crystal TV, digital still camera, mobile music machinery, etc.), there is an increasing demand for small-sized electro-acoustic transducers, such as small-sized speakers (generally called microspeakers), small-sized receivers and further microphones, earphones and others used in those electronics.

In general, a diaphragm for speakers is required to have a low density so as to maintain the acoustic radiation sound pressure level, to have high rigidity for inhibiting strain so as to increase the allowable input resistance, and additionally to have a large specific modulus of elasticity so as to broaden the reproduction frequency band region, and to have a large internal loss for suppressing the divided vibration of the diaphragm so as to flatten the frequency characteristics. In use near a speaker driving source, voice coil, or in use in in-vehicle speakers, the diaphragm may be exposed to high temperature for a long period of time, and therefore it must have heat resistance fully bearable to such use conditions.

On the other hand, with the recent background of mobile or ubiquitous society or music source digitalization, various small electronics are made to have higher function and higher performance. Even in the speakers to be used in these, for example, in the speakers in mobile telephones, the input-output resistance level required for the diaphragm is being improved to be at least from 0.5 to 0.6 W or so (at present, the uppermost limit is 1.2 W or so) for high-output models, as compared with popular models with 0.3 W or so. At present, there are many types of models with from 0.6 to 0.8 W or so, and the ratio of models with more than 1.0 W is low.

Regarding diaphragms for speakers, for example, Patent References JP-A-60-139099, JP-A-59-63897, and JP-A-2002-291092 disclose a diaphragm for speakers, formed of a film of an aromatic polysulfone resin, concretely a polyether sulfone resin. These patent references disclose that when a film of a polyether sulfone resin is used, the formability, the heat resistance and the acoustic characteristics of the diaphragm for speakers are excellent. However, the diaphragm for speakers described in these patent references is problematic in that its durability in high-output operation is insufficient and the diaphragm may be often cracked or broken. In these patent references, nothing is described or investigated relating to the structure of an aromatic polysulfone resin, in particular to a diaphragm for speakers formed of a film of an aromatic polysulfone resin having a specific repetitive unit and the durability thereof in high-output operation.

Japanese Patent JP-A-58-222699 discloses a diaphragm for speakers, formed of an aromatic polyether ketone resin, concretely a polyether-ether ketone resin. This patent reference says that the modulus of elasticity of the film of a polyether-ether ketone resin is 30,000 kg/cm² (about 3000 MPa) and is high, and therefore the film is excellent in high-pitched tone reproduction. However, this patent reference has no description of microspeakers and low-pitched tone reproduction with microspeakers, or has neither description nor investigation of the durability in high-output operation of a diaphragm formed of a mixture of an aromatic polyether ketone resin and any other resin and of the formability of the diaphragm.

On the other hand, as a diaphragm for speakers excellent in the durability in high-output operation, used is a biaxially-stretched thermally-fixed film of a polyethylene naphthalate resin (PEN) film or a polyphenylene sulfide resin (PPS) film. However, these films are crystalline and their rigidity is too high, and therefore, their minimum resonance frequency ($f_0$: f zero) is high and their acoustic characteristics are insufficient, for example, their low-pitched tone reproducibility is poor, and in particular, are problematic in that their formability into diaphragms (by press forming or vacuum forming) and their forming cycle are inferior to amorphous resins (polyetherimide, etc.) having a high glass transition temperature (Tg).

SUMMARY OF THE INVENTION

An object of the present invention is to provide a diaphragm for electro-acoustic transducers excellent in the formability and the durability in high-output operation, and to provide a film for use in the diaphragm.

Specifically, the present invention relates to the following:

(1) A diaphragm for electro-acoustic transducers, formed of a film, the film contains a polybiphenyl ether sulfone resin (A) having a repetitive unit of the following structural formula (I):

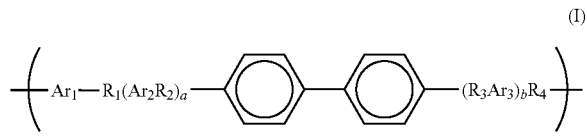

wherein $R_1$ to $R_4$ each represent —O—, —$SO_2$—, —S— or —C=O, but at least one of $R_1$ to $R_4$ is —$SO_2$— and at least one of $R_1$ to $R_4$ is —O—; wherein $Ar_1$, $Ar_2$ and $Ar_3$ each represent an arylene group having from 6 to 24 carbon atoms; and wherein a and b is 0 or 1;

(2) A diaphragm for electro-acoustic transducers, formed of a film, the film contains a polybiphenyl ether sulfone resin (A) having a repetitive unit of the above structural formula (I), and a crystalline resin (B); and (3) A film for use as the diaphragm for electro-acoustic transducers of the above (1) or (2).

According to the present invention, there are provided a diaphragm for electro-acoustic transducers excellent in the formability and the durability in high-output operation, and a film for diaphragms for use for it.

DETAILED DESCRIPTION OF THE INVENTION

The present invention will be described in detail as follows.

"Main ingredient" in this specification means the ingredient contained most abundantly, and its content is generally at least 50% by mass, preferably at least 80% by mass.

The diaphragm for electro-acoustic transducers of the present invention includes a filmcontaining a polybiphenyl ether sulfone resin (A). In this, the polybiphenyl ether sulfone resin is a thermoplastic resin containing an aromatic nucleus bond, a sulfone bond, an ether bond and a biphenyl bond in its structural unit, and is an aromatic polysulfone resin having a repetitive unit of the following structural formula (I):

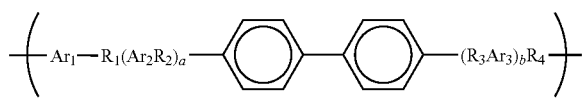

(I)

In the above formula, $R_1$ to $R_4$ each represent —O—, —$SO_2$—, —S— or —C=O, but preferably —O— or —$SO_2$— from the viewpoint of the thermal stability and the forming workability. However, at least one of $R_1$ to $R_4$ is —$SO_2$— and at least one of $R_1$ to $R_4$ is —O—. $Ar_1$, $Ar_2$ and $Ar_3$ each represent an arylene group having from 6 to 24 carbon atoms, but preferably a phenylene group or a biphenylene group from the viewpoint of the heat resistance and the rigidity. a and b is 0 or 1.

In general, with the increase in the concentration of the biphenyl or biphenylene group in the polybiphenyl ether sulfone resin (A), the characteristics such as the impact resistance of the polymer may be better. From this viewpoint, in the repetitive unit of the structural formula (I), the arylene groups $Ar_1$, $Ar_2$ and $Ar_3$ are preferably in an amount of at least 50 mol % each, more preferably at least 75 mol % each; and preferably, they each are a biphenylene group such as a p-biphenylene group. Containing a biphenyl bond as the indispensable constitutive unit, the resin may exhibit the excellent durability in high-output operation. The number of the repetitive units of the structural formula (I) may be generally an integer of from 1 to 100, but preferably from 20 to 50 from the viewpoint of securing the mechanical properties.

In this, the polybiphenyl ether sulfone resin having a repetitive unit of the structural formula (I) may have various combinations of the repetitive units, but in the present invention, the resin has a glass transition temperature (Tg) of preferably from 150 to 320° C., more preferably from 160 to 300° C., even more preferably from 180 to 250° C. When the glass transition temperature (Tg) of the resin is not lower than the above-mentioned lowermost limit, then it is favorable since the diaphragm may have sufficient heat resistance even when used near a speaker driving source, voice coil or in in-vehicle speakers. On the other hand, when the temperature is not higher than the above-mentioned uppermost limit, then it is favorable since the diaphragm may be formed (by press forming or by vacuum forming) at a relatively low temperature.

In the present invention, in particular, a polyphenyl sulfone resin having a repetitive unit of the following structural formula (II) and having a glass transition temperature (Tg) of 220° C. is preferably used as the polybiphenyl ether sulfone resin (A), from the viewpoint of the processability in film formation, and the workability, the heat resistance, the acoustic characteristics and the durability in high-output operation of the diaphragm. Concretely, it is commercially available as a trade name "Radel R" from Solvay Advanced Polymers.

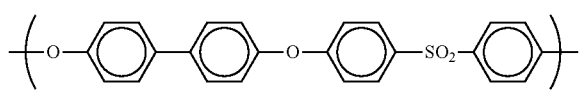

(II)

The production method for the polybiphenyl ether sulfone resin (A) for use in the present invention is not specifically defined, and known methods are all employable. For example, these are described in detail in the specifications of U.S. Pat. Nos. 3,634,355, 4,008,203, 9,108,837, 4,175,175, etc. Commercially-available resins may be used directly as they are. One or more different types of polybiphenyl ether sulfone resins may be used either singly or as suitably combined.

The diaphragm for electro-acoustic transducers of the present invention may be formed of a film that contains the above-mentioned polybiphenyl ether sulfone resin (A); and from the viewpoint of the workability, the acoustic characteristics and the durability in high-output operation of the diaphragm, the resin composition to constitute the film preferably contains the polybiphenyl ether sulfone resin (A) in an amount of at least 50% by mass, more preferably at least 60% by mass, even more preferably at least 80% by mass.

If desired, any other resin may be mixed in the resin composition to constitute the film. In case of mixing it, the blend ratio by mass is preferably polybiphenyl ether sulfone resin (A)/other resin=(1 to 99)/(99 to 1), more preferably (30 to 90)/(70 to 10), even more preferably (50 to 80)/(50 to 20), from the viewpoint of the workability, the acoustic characteristics and the durability in high-output operation of the diaphragm.

The other resin may include, for example, polyolefin resin, polyamide resin, polyester resin, syndiotactic polystyrene resin, polyurethane resin, polysulfone resin, polyether sulfone resin, polyether ketone resin, polyether-ether ketone resin, polyarylate resin, polyamideimide resin, polycarbonate resin, modified polyphenylene ether resin, polyetherimide resin, thermoplastic polyimide resin, polyether-nitrile resin, liquid-crystal polymer and thermoplastic elastomer; but in the present invention, from the viewpoint of the compatibility with the polybiphenyl ether sulfone resin and the processability in film formation, preferably used are polyether ketone resin, polyether-ether ketone resin and polyetherimide resin, and more preferred is polyether-ether ketone resin. One or more such other additional resins may be used herein, either singly or as suitably combined.

The diaphragm for electro-acoustic transducers of the present invention is formed of a film that contains a polybiphenyl ether sulfone resin (A) and, as the other resin, a crystalline resin (B).

The polybiphenyl ether sulfone resin (A) is as described in the above.

The crystalline resin (B) is a resin that has a crystal melting peak temperature (Tm) in differential scanning calorimetry, and for example, it includes polyolefin resin, polyamide resin, polyester resin, syndiotactic polystyrene resin, polyphenylene sulfide resin, polyketone resin, polyaryl ketone resin, thermoplastic polyimide resin, polyether-nitrile resin; and one or more of these may be used either singly or as suitably combined.

Preferably, the crystal melting peak temperature (Tm) of the crystalline resin (B) is from 260 to 380° C., more preferably from 280 to 380° C. When the crystal melting peak temperature is not lower than 260° C., then the heat resistance of the diaphragm for electro-acoustic transducers of the present invention may be improved, and, for example, the heat resistance in the reflow step may be secured. On the other hand, when the crystal melting peak temperature is not higher than 380° C., then it is favorable since, for example, ordinary equipment may be used in melt forming into films and the films may be worked at relatively low temperatures (the uppermost temperature of 430° C.).

Further, the crystal melting peak temperature (Tm) of the crystalline resin (B) and the glass transition temperature (Tg) of the polybiphenyl ether sulfone resin (A) are preferably in a relation of Tg<Tm, but more preferably, Tm is higher by at least 30° C. than Tg. When the relation is satisfied, the film may be prevented from drawing down even though there occurs a film temperature distribution within a temperature range not lower than the glass transition temperature (Tg) of the polybiphenyl ether sulfone resin (A) while the film is worked into a diaphragm by hot-press forming, and in addition, the stress-strain curve in the working temperature range may be improved, and as a result, diaphragms of good thickness accuracy may be fabricated.

In the present invention, polyaryl ketone resin is favorably used, having good compatibility with the polybiphenyl ether sulfone resin (A), having a forming and processing temperature range near to that of the resin (A) and having excellent heat resistance and mechanical characteristics. The polyaryl ketone resin is a thermoplastic resin containing an aromatic nucleus bond, an ether bond and a ketone bond in its structural unit; and its typical examples are polyether ketone resin, polyether-ether ketone resin and polyether ketone ketone resin and others. In the present invention, favorably used is a polyether-ether ketone resin having a repetitive unit of the following structural formula (III), as having good compatibility (miscibility) with the polybiphenyl ether sulfone resin (A), having a forming and processing temperature range near to that of the resin (A) and having excellent heat resistance and mechanical characteristics, and from the viewpoint of the processability in film formation, and the workability, the heat resistance, the acoustic characteristics and the durability in high-output operation of the diaphragm.

The number of the repetitive units of the structural formula (III) may be generally an integer of from 1 to 150, but preferably from 30 to 70 from the viewpoint of securing the mechanical properties and of the melt-kneading/forming processability.

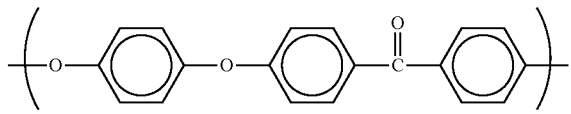

(III)

Concretely, they are commercially available from VICTREX as trade names VICTREX PEEK "151G", "381G", "450G"; from DEGUSSA as trade names VESTAKEEP "2000G", "3001G", "4000G"; from Solvay Advanced Polymers as trade names Keta Spire PEEK "KT-820NT", "KT-880NT"; and from Gharda Chemicals as trade names GATONE PEEK "5300", "5400", "5600" and others.

In the present invention, the blend ratio by mass of the above-mentioned polybiphenyl ether sulfone resin (A) to the crystalline resin (B) is preferably polybiphenyl ether sulfone resin (A)/crystalline resin (B)=(95 to 50)/(5 to 50). The blend ratio by mass falling within the range is favorable since, in general, when the resin composition is formed into a diaphragm by thermal press forming and the like in order that the amorphous resin, polybiphenyl ether sulfone resin (A) forms the matrix (sea) of the film, the workability and the working cycle are good, and in addition, the adhesiveness to voice coils and housings with various adhesives (e.g., UV-curable adhesives such as acrylic or epoxy adhesives or solvent-diluting type adhesives) and organic solvents is also good. Further, the crystalline resin (B) improves the heat resistance and the solvent resistance, and when the resin composition is formed into a diaphragm by thermal press forming and the like, the stress-strain curve within the working temperature range may also be improved and, as a result, diaphragms of good thickness accuracy and good deep drawability may be favorably fabricated. From these, in the present invention, the blend ratio by mass of the polybiphenyl ether sulfone resin (A) to the crystalline resin (B) is, as (A)/(B), preferably (95 to 55)/(5 to 45), more preferably (90 to 60)/(10 to 40); and even more preferably (A)/(B) is (85 to 65)/(15 to 35).

For the above-mentioned diaphragm for electro-acoustic transducers, preferably used is the film that contains, as the main ingredients, the above-mentioned polybiphenyl ether sulfone resin (A) and the crystalline resin (B); and, if desired, any other resin may be mixed in the resin composition to constitute the film in an amount of at most 30% by mass, preferably at most 20% by mass.

The other resin may include polyurethane resin, polysulfone resin, polyether sulfone resin, polyarylate resin, polycarbonate resin, modified polyphenylene ether resin, polyetherimide resin, thermoplastic polyimide resin, liquid-crystal polymer and thermoplastic elastomer and the like; but in the present invention, from the viewpoint of the compatibility with the main ingredient resin and the processability in film formation, preferably used are polysulfone resin and polyetherimide resin. One or more such other additional resins may be used herein, either singly or as suitably combined.

Further, filler and various additives, for example, heat stabilizer, UV absorbent, light stabilizer, nucleating agent, colorant, lubricant and flame retardant may be suitably incorporated in the resin composition to constitute the polybiphenyl ether sulfone resin-containing film.

The film for use in forming the diaphragm for electro-acoustic transducers of the present invention and its production methods are described below. First, for the film formation method, any known method is employable, including, for example, an extrusion casting method with a T-die, a calendering method or a flow casting method. An extrusion casting method with a T-die is favorably employed from the viewpoint of the film producibility. The forming temperature in the extrusion casting method with a T-die may be suitably controlled depending on the flow characteristics and the film formability of the composition to be used, but may be generally from approximately 300° C. to 430° C. Any of single-screw extruders, twin-screw extruders, kneaders and mixers and the like generally used may be used herein. Preferred are twin-screw extruders and more preferred are co-rotating twin-screw extruders from the viewpoint of the uniform dispersibility of the mixed resin composition and of the stability of the properties of the obtained film.

For the diaphragm for electro-acoustic transducers, especially for the diaphragm for speakers, the mean thickness may be from 5 to 150 μm, generally from approximately 8 to 100 μm. The film thickness accuracy (%) ([(film thickness−mean thickness)/(mean thickness)]×100) has some influence on the acoustic properties such as the reproduction frequency band region and the frequency characteristics, and is therefore preferably within ±10%, more preferably within ±8%, even more preferably within ±5%. Preferably, the film formation is so controlled that the anisotropy of the physical properties of the film in the machine direction (MD) from the extruder and in the transverse direction (TD) is as small as possible.

Also preferably, the tensile modulus of elasticity of the film is from 1000 MPa to less than 3000 MPa. When the tensile modulus of elasticity is at least 1000 MPa, then the film is favorably tough (stiff) enough for use as diaphragms for electro-acoustic transducers; while, on the other hand, when the tensile modulus of elasticity is less than 3000 MPa, then it is also favorable since, for example for diaphragms for microspeakers, even though the film having a thickness of from 20 to 40 μm and having excellent handlability and durability in high-output operation is used, its minimum resonance frequency ($f_0$: f zero) is sufficiently low, and the low-pitched tone reproducibility is secured to attain good sound quality. From these, in the present invention, the above-mentioned tensile modulus of elasticity is more preferably from 1000 MPa to less than 2500 MPa, even more preferably from 2000 MPa to less than 2500 MPa.

In this, for example, the polyethylene naphthalate resin (PEN) film has a tensile modulus of elasticity of 6000 MPa or so, and therefore, for diaphragms for microspeakers for mobile telephones and the like, the film must be considerably thinned for reducing its minimum resonance frequency ($f_0$: f zero), and influence on the handling thereof and also during the process of working into diaphragms due to static electricity becomes large.

Thus obtained, the film is further worked into diaphragms for electro-acoustic transducers. In this, a diaphragm for speakers is described as one example. The working method is not specifically defined. Taking its glass transition temperature and softening temperature into consideration, the film may be heated and worked into a dome shape or a cone shape by press forming or vacuum forming. The shape of the diaphragm is not specifically defined and may be any desired one. Any of circular, elliptical or oval shapes may be selected.

The film obtained in the present invention has a relative low tensile modulus of elasticity, and therefore, especially when it is used for diaphragms for small-sized electro-acoustic transducers, then it is favorable since it may secure a low-pitched tone reproduction range and for good sound quality. Regarding the size of the diaphragm, its maximum diameter may be favorably at most 25 mm, preferably at most 20 mm and its lowermost limit may be generally 5 mm or so from the viewpoint of reducing the size and the weight of the diaphragm. The maximum diameter means the diameter of the diaphragm that is circular, and means the major diameter of the diaphragm that is elliptical or oval.

In the present invention, as so described in the above, the shape of the diaphragm is not specifically defined and may be any desired one, and any of circular, elliptical or oval shapes may be selected. For example, in case where the diaphragm is desired to have deep drawability for the recess for holding a voice coil, as in Japanese patents JP-A-5-30592 and 11-146487, it is desirable that the film to be used has a tensile elongation at break within the film-working temperature range of at least 100%, preferably at least 200%, more preferably at least 300%. The uppermost limit may be generally 600% or so. In this, the film having a tensile elongation at break of at least 300% is especially favorable since it may be stably worked into various shapes of diaphragms with little trouble of breakage.

The surface of the diaphragm may be suitably worked to have a groove with a V-shaped cross-sectional profile, referred to as a tangential edge. In this case, the mean thickness of the film is preferably at most 40 μm, more preferably from 20 to 38 μm. This is because the film thickness could be sufficiently secured and therefore the film handlability is good and the film workability per hour in press forming and the like and the working accuracy (shape reproducibility) are readily improved. In addition, for controlling the workability and the dust repellency and also the acoustic characteristics of the diaphragm, the surface of the film or the shaped diaphragm may be further coated with an antistatic agent or various elastomer (e.g., urethane-type, silicone-type, hydrocarbon-type or fluorine-containing elastomer or the like), or may be coated with metal by vapor deposition or sputtering, or may be suitably processed for coloring (black, white or others). Further, the diaphragm may be suitably laminated with a metal such as aluminium or with any other film, or may be hybridized with a nonwoven fabric.

The diaphragm for electro-acoustic transducers of the present invention is, when used as a diaphragm for speakers, for example, excellent in the durability in high-output operation. For example, ordinary models of mobile telephones have an output resistance level of 0.3 W or so; but the diaphragm of the present invention is applicable to high-output models with an output resistance level of from approximately 0.6 to 1.0 W. In addition, since polybiphenyl ether sulfone resin is generally an amorphous highly heat-resistant resin, the film that contains the polybiphenyl ether sulfone resin (A), and further the film that contains the polybiphenyl ether sulfone resin (A) and the crystalline resin (B), especially the film that contains the above resin (A) or the resin (A) and the resin (B) as the main ingredients are excellent in the basic acoustic characteristics as diaphragms for speakers, especially as diaphragms for microspeakers, and in addition, excellent in the heat resistance and the formability at the working into diaphragms.

As in the above, the diaphragm for electro-acoustic transducers of the present invention is favorably used as diaphragms for speakers from the viewpoint of the heat resistance, the acoustic characteristics and the durability in high-output operation thereof; and regarding the application range of the diaphragm for electro-acoustic transducers of the present invention, it is applicable to all electro-acoustic transducers including speakers and in addition, receivers, microphones and earphones. In particular, the diaphragm is favorable for microspeakers of mobile telephones.

The present invention is described more concretely with reference to the following Examples, by which, however, the present invention should not be limited at all. Various data and evaluation of the films shown in this specification are determined as follows. In this, the flow direction of the film from extruder is referred to as the machine direction, and the direction perpendicular to it is as the cross direction.

(1) Glass Transition Temperature (Tg), Crystal Melting Peak Temperature (Tm):

Using Perkin Elmer's DSC-7, 10 mg of a sample is heated at a heating rate of 10° C./min according to JIS K7121, and the data are obtained from the thermogram.

(2) Film Specific Gravity:

The obtained film is analyzed according to JIS K7112 (method D).

(3) Tensile Modulus of Elasticity:

The obtained film is analyzed for the cross direction, according to JIS K7127 at a temperature of 23° C.

(4) Tensile Elongation at Break (200° C.)

The obtained film is analyzed for the machine direction, according to JIS K7127 at a temperature of 200° C. and at a test speed of 200 mm/min. In addition, the results as evaluated according to the following standards are also shown.

(Excellent): The tensile elongation at break is at least 300%.
(Good): The tensile elongation at break is from 100% to less than 300%.
(Poor): The tensile elongation at break is less than 100%.

(5) Durability Evaluation:

The obtained film is heated at 230° C. and formed into a o16-mm circular domed diaphragm having a tangential edge, according to press forming. Next, a microspeaker unit comprising a voice coil, a magnet, a frame and a damper is constructed. The obtained microspeaker is connected to the terminal of a durability tester (SIGMA Electronics' ST-2000B), and while the load thereto is changed in an EIA mode with white noise, the condition of the diaphragm is evaluated.

Regarding the above evaluation, in Examples 1 and 2 and Comparative Example 1, the condition of the diaphragm is evaluated according to the following standards while the load thereto is changed on 3 levels of 0.3 W (1.55 V), 0.7 W (2.37 V) and 1.0 W (2.83 V) in an EIA mode with white noise of the durability tester (SIGMA Electronics' ST-2000B) (number of tested samples: 5 sets).

(Good): In at least 4 sets, the diaphragm is neither cracked nor broken in continuous input operation for 100 hours.
(Fair): In at least 2 sets, the diaphragm is cracked or broken within from 10 hours to less than 100 hours.
(Poor): In at least one set, the diaphragm is cracked or broken within less than 10 hours.

In Examples 3 to 5 and Comparative Examples 1 and 2, the input load is changed at an interval of 0.1 W from 0.3 W (1.55 V) to 0.8 W (2.53 V) in an EIA mode with white noise, and in continuous input operation for 100 hours, the maximum input level (W) at which all the diaphragms of 5 sets are neither cracked nor broken is read. In addition, the results as evaluated according to the following standards are also shown.

(Good): The maximum input level is at least 0.6 W.
(Poor): The maximum input level is at most 0.5 W.

(6) Mean Thickness of Film:

The obtained film was measured at 20 points at regular intervals in the cross direction thereof, using a micrometer, and the data are averaged.

Example 1

As a polybiphenyl ether sulfone resin, 100 parts by mass of polyphenyl sulfone resin (Solvay Advanced Polymers' Radel R-5000, amorphous resin having Tg of 220° C.) (hereinafter this may be simply abbreviated as PPSU) was melt-kneaded, using a single-screw extruder having a diameter of 40 mm and equipped with a T-die, at a set temperature of 370° C., and rapidly cooled on a cast roll at 190° C. for film formation thereon to give a film having a mean thickness of 35.0 µm. The obtained film was evaluated and the results are shown in Table 1.

Example 2

A film having a mean thickness of 35.0 µm was obtained in the same manner as in Example 1, for which, however, the resin composition to constitute the film was changed from 100 parts by mass of PPSU to a mixed resin composition of 50 parts by mass of PPSU and 50 parts by mass of polyether-ether ketone resin (Victrex's PEEK450G, having Tg of 143° C. and Tm of 334° C.) (hereinafter this may be simply abbreviated as PEEK). The obtained film was evaluated and the results are shown in Table 1.

Comparative Example 1

A film having a mean thickness of 35.0 µm was obtained in the same manner as in Example 1, for which, however, the resin composition to constitute the film was changed from 100 parts by mass of PPSU to 100 parts by mass of polyether sulfone resin (Sumitomo Chemical's SUMICAEXCEL PES4100G, amorphous resin having Tg of 223° C.) (hereinafter this may be simply abbreviated as PES). The obtained film was evaluated and the results are shown in Table 1.

TABLE 1

| | | Example 1 | Example 2 | Comparative Example 1 |
|---|---|---|---|---|
| PPSU (mas.pt.) | | 100 | 50 | |
| PEEK (mas.pt.) | | | 50 | |
| PES (mas.pt.) | | | | 100 |
| File specific gravity (-) | | 1.29 | 1.30 | 1.37 |
| Tensile modulus of elasticity (MPa) | | 2300 | 2850 | 2600 |
| Durability evaluation | 0.3 W | Good | Good | Good |
| | 0.7 W | Good | Good | Poor |
| | 1.0 W | Fair | Good | — |

From Table 1, it is confirmed that the diaphragms for speakers formed of the polybiphenyl ether sulfone resin-containing film of the present invention have good formability and are excellent in the durability in high-output operation (Example 1, Example 2). On the other hand, it is confirmed that the diaphragm for speakers formed of the film of a conventional polyether sulfone resin not having a biphenyl bond is good at the formability but its durability in high-output operation is insufficient (Comparative Example 1).

Example 3

85 parts by mass of PPSU as a polybiphenyl ether sulfone resin (A) and 15 parts by mass of PEEK as a crystalline resin (B) were melt-kneaded at a set temperature of 370° C., using a single-screw extruder having a diameter of 40 mm and equipped with a T-die, and then rapidly cooled on a cast roll at 190° C. thereby producing a film having a mean thickness of 35.0 µm. The obtained film was evaluated and the results are shown in Table 2.

Example 4

A film having a mean thickness of 35.0 µm was obtained in the same manner as in Example 3, for which, however, the resin composition to constitute the film was changed to a mixed resin composition of 70 parts by mass of PPSU and 30 parts by mass of PEEK as in Table 2. The obtained film was evaluated and the results are shown in Table 2.

Example 5

A film having a mean thickness of 35.0 µm was obtained in the same manner as in Example 3, for which, however, polyether-ether ketone resin (Victrex's PEEK-HTG22, having Tg of 162° C. and Tm of 378° C.) (hereinafter this may be simply abbreviated as PEK) was used in place of PEEK as the crystalline resin (B) in Example 4, as in Table 2, and the set temperature in melt-kneading was changed to 390° C. The obtained film was evaluated and the results are shown in Table 2.

Comparative Example 2

A film having a mean thickness of 35.0 μm was obtained in the same manner as in Example 3, for which, however, the resin composition to constitute the film was changed from PPSU in Example 4 to PES, as in Table 2. The obtained film was evaluated and the results are shown in Table 2.

Also the film obtained in Comparative Example 1 was evaluated for its durability in the same manner as in Examples 3 to 5, and the results are shown in Table 2.

TABLE 2

|  | Example | | | Comparative Example | |
| --- | --- | --- | --- | --- | --- |
|  | 3 | 4 | 5 | 1 | 2 |
| PPSU (mas.pt.) | 85 | 70 | 70 |  |  |
| PES (mas.pt.) |  |  |  | 100 | 70 |
| PEEK (mas.pt.) | 15 | 30 |  |  | 30 |
| PEK (mas.pt.) |  |  | 30 |  |  |
| File specific gravity (-) | 1.29 | 1.29 | 1.30 | 1.37 | 1.33 |
| Tensile modulus of elasticity (MPa) | 2320 | 2350 | 2470 | 2600 | 2660 |
| Durability (W) | 0.7 Good | 0.8 Good | 0.8 Good | 0.5 Poor | 0.4 Poor |
| Tensile elongation at break (%) (200° C.) | 358.2 Excellent | 464.9 Excellent | 421.1 Excellent | 93.1 Poor | 168.4 Good |

From Table 2, it is confirmed that the diaphragms for speakers formed of the film containing, as the main ingredients, the polybiphenyl ether sulfone resin (A) and the crystalline resin (B) of the present invention have good formability and are excellent in the durability in high-output operation, and in addition, the tensile elongation at break thereof within the processing temperature range (200° C.) is large, and, for example, they are also excellent in the deep drawability (Examples 3 to 5). The tensile elongation at break at 200° C. of the film of PPSU alone was 285.2%. On the other hand, it is confirmed that the diaphragms for speakers formed of the film of a conventional polyether sulfone resin not having a biphenyl bond (Comparative Example 1) or the film containing the resin and PEEK (Comparative Example 2) are excellent in the formability but their durability in high-output operation is insufficient. The miscibility between PES and PEEK is inferior to the miscibility between PPSU and PEEK, and therefore it is confirmed that, in Comparative Example 2, even though PEEK was mixed in the composition, the durability of the diaphragm was rather lowered.

The diaphragm for electro-acoustic transducers of the present invention is excellent in the formability and the durability in high-output operation, and is therefore usable as diaphragms for speakers used in various small electronics (for example, mobile telephone, PDA, laptop computer, DVD, liquid-crystal TV, digital still camera, mobile music machinery, etc.), and also in electro-acoustic transducers such as receivers, microphones and earphones.

Having described preferred embodiments of the invention, it is to be understood that the invention is not limited to those precise embodiments, and that various changes and modifications may be effected therein by one skilled in the art without departing from the scope or spirit of the invention as defined in the appended claims.

The invention claimed is:

1. A diaphragm for an electro-acoustic transducer, comprising:
   a film having a mean thickness of from 5 to 150 μm,
   wherein the film comprises a crystalline resin (B) and a polybiphenyl ether sulfone resin (A) having a repetitive unit of the following structural formula (1):

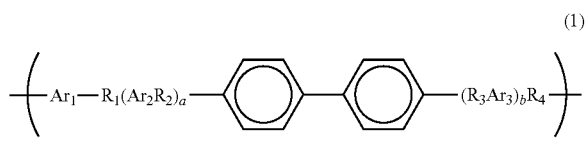

(1)

wherein $R_1$ to $R_4$ each represent —O—, —SO$_2$—, —S— or C=O, but at least one of $R_1$ to $R_4$ is —SO$_2$— and at least one of $R_1$ to $R_4$ is —O—; $Ar_1$, $Ar_2$ and $Ar_3$ each represent an arylene group having from 6 to 24 carbon atoms; and a and b each are any of 0 or 1.

2. The diaphragm as claimed in claim 1, wherein the crystalline resin (B) is a polyaryl ketone resin.

3. The diaphragm as claimed in claim 1, wherein the crystalline resin (B) is a polyether-ether ketone resin having a repetitive unit of the following structural formula (3):

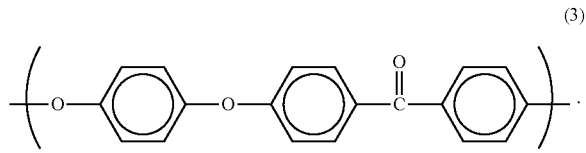

(3)

4. The diaphragm as claimed in claim 1, wherein the film comprises the polybiphenyl ether sulfone resin (A) and the crystalline resin (B) in a ratio by mass of (A)/(B)=(95 to 55)/(5 to 45).

5. The diaphragm as claimed in claim 1, wherein the diaphragm is a diaphragm for speakers.

6. The diaphragm as claimed in claim 1, wherein the polybiphenyl ether sulfone resin (A) includes a polyphenyl sulfone resin having a repetitive unit of the following structural formula (2):

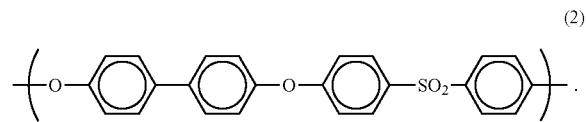

(2)

7. The diaphragm as claimed in claim 1, wherein the glass transition temperature of the polybiphenyl ether sulfone resin (A) is from 180 to 250° C.

8. The diaphragm as claimed in claim 1, wherein the maximum diameter of the diaphragm is 25 mm.

9. The diaphragm as claimed in claim 1, wherein the film has a tensile modulus of elasticity of from 1000 MPa to less than 2500 MPa.

10. The diaphragm as claimed in claim 1, wherein the film has a mean thickness of at most 40 μm.

11. The diaphragm as claimed in claim 1, wherein the film consists of thermoplastic resins.

12. The diaphragm as claimed in claim 1, wherein the film does not contain a flame retardant.

13. The diaphragm as claimed in claim 1, wherein the film is obtained by extruding a thermoplastic composition comprising the polybiphenyl ether sulfone resin (A) and the crystalline resin (B).

* * * * *